US007399106B2

(12) United States Patent
Reading

(10) Patent No.: US 7,399,106 B2
(45) Date of Patent: Jul. 15, 2008

(54) LENS OPTICS USED TO REDUCE PART DEFORMATION DUE TO HEAT

(75) Inventor: Paul Anthony Reading, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/151,607

(22) Filed: Jun. 13, 2005

(65) Prior Publication Data

US 2006/0291227 A1 Dec. 28, 2006

(51) Int. Cl.
*F21V 5/00* (2006.01)
*B60Q 1/00* (2006.01)

(52) U.S. Cl. ...................... 362/521; 362/507; 362/520; 362/547; 362/311

(58) Field of Classification Search ................. 362/518, 362/345, 516, 307, 475, 522, 506, 311, 313, 362/509, 487, 517, 335, 294, 546, 169, 547, 362/373, 455, 520, 521
See application file for complete search history.

(56) References Cited

U.S. PATENT DOCUMENTS

| | | | | | |
|---|---|---|---|---|---|
| 3,140,340 | A | * | 7/1964 | Weber | 359/514 |
| 3,525,566 | A | * | 8/1970 | Altman | 353/66 |
| 4,644,455 | A | * | 2/1987 | Inglis et al. | 362/509 |
| 4,654,761 | A | * | 3/1987 | Walsh | 362/521 |
| 4,912,606 | A | * | 3/1990 | Yamamoto | 362/518 |
| 5,128,839 | A | * | 7/1992 | Kato | 362/521 |
| 6,019,492 | A | * | 2/2000 | Ikegaya et al. | 362/521 |
| 6,220,736 | B1 | * | 4/2001 | Dobler et al. | 362/539 |
| 6,352,359 | B1 | * | 3/2002 | Shie et al. | 362/522 |
| 6,543,923 | B2 | * | 4/2003 | Tamai | 362/521 |
| 2002/0057577 | A1 | * | 5/2002 | Oschmann et al. | 362/507 |
| 2002/0181236 | A1 | * | 12/2002 | Aoki | 362/296 |
| 2003/0227781 | A1 | * | 12/2003 | Mochizuki | 362/517 |
| 2005/0190572 | A1 | * | 9/2005 | Komatsu et al. | 362/538 |

FOREIGN PATENT DOCUMENTS

| | | |
|---|---|---|
| JP | 04-260843 | 9/1992 |
| JP | 06-31001 | 4/1994 |
| JP | 10-321012 | 4/1998 |
| JP | 2002-523861 | 7/2002 |
| WO | WO 0010835 | 3/2000 |

* cited by examiner

*Primary Examiner*—John A. Ward
*Assistant Examiner*—David R Crowe
(74) *Attorney, Agent, or Firm*—Gifford, Krass, Sprinkle, Anderson & Citkowski, P.C.

(57) ABSTRACT

A light assembly for an automotive vehicle includes a lens holder that supports an internal lens. The light assembly includes a light source powered by the vehicle. The internal lens includes a first surface having a plurality of protrusions. The protrusion scatter and diffuse heat emitted from the light source away from an outwardly positioned reflex lens and an outer lens. The protrusions also reflect light toward a reflector to increase the overall brightness observed coming from the light assembly.

5 Claims, 3 Drawing Sheets

LENS OPTICS USED TO REDUCE PART DEFORMATION DUE TO HEAT

BACKGROUND OF THE INVENTION

1. Field of the Invention

The invention relates to light assemblies for automotive vehicles. More particularly, the invention relates to a lens holder having an inner lens for diffusing heat emitted from a light source.

2. Description of the Related Art

Automotive vehicles include light assemblies for providing indicator signals visible to persons in other vehicle or as pedestrians. A light assembly typically includes a housing defining an enclosed space and a socket for supporting a light emitting source, such as an incandescent bulb, within the enclosed space. The housing also includes an outer lens that is colored according to its specific function, such as red for a stop signal and yellow or orange for turn signals. Packaging constraints due to aesthetics or function sometimes require the design of a compact light assembly, resulting in a short distance between the light emitting source and the outer lens. But, the outer lens cannot be placed too close to the light-emitting source due to heat that radiates therefrom. Thus, it remain desirable to provide a means of diffusing or blocking heat coming from the light emitting source to allow the design of a more compact housing for the light assembly.

SUMMARY OF THE INVENTION

According to one aspect of the invention, a lens assembly is provided for use with an automotive vehicle has a light source. The lens assembly includes an outer lens, a reflex lens, a lens holder and an internal lens. The lens holder has an inner surface facing the light source. The holder has an outer surface opposite the inner surface. The reflex lens is mounted to the outer surface. The internal lens is positioned between the light source and the reflex lens. The internal lens has a first surface facing the light source. The internal lens has a second surface opposite the first surface. The second surface is spaced apart from the reflex lens. The internal lens has a plurality of protrusions extending outwardly from one of the first and second surfaces for deflecting light and heat away from the outer and reflex lenses, thereby increasing the luminosity of the light that is observed to be emitted from the light source.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

An embodiment of the invention provides an optical light assembly for use on an automotive vehicle that includes a novel inner lens design that disperses heat and light energy emitted from a light source, which minimizes deformation of a plastic lens placed in proximity to the light source.

Figure 1:
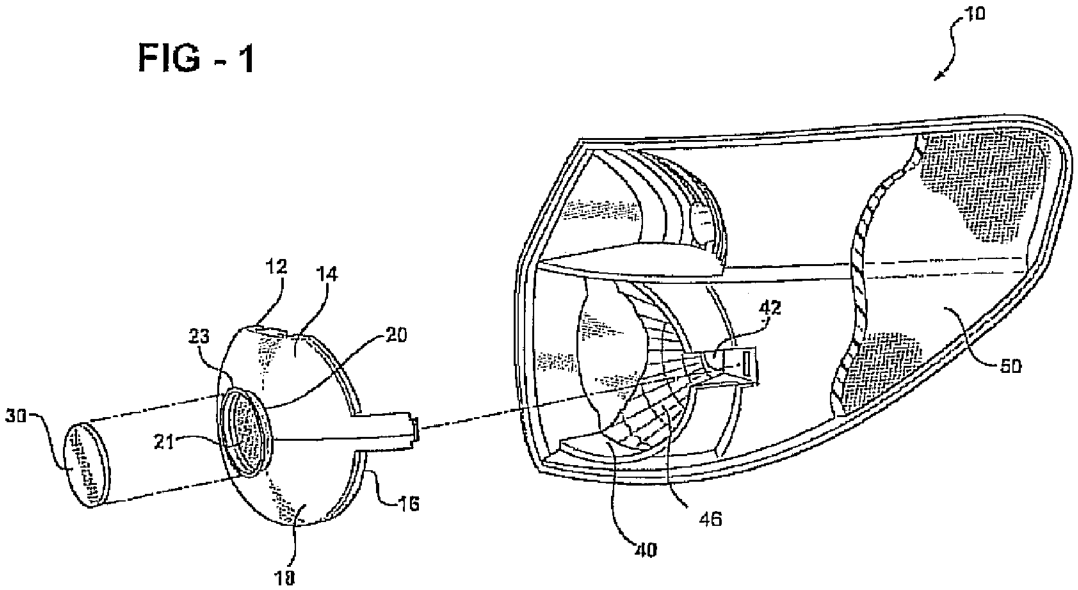
FIG. 1 is an exploded perspective view of a light assembly according to an embodiment of the invention.
Figure 4:
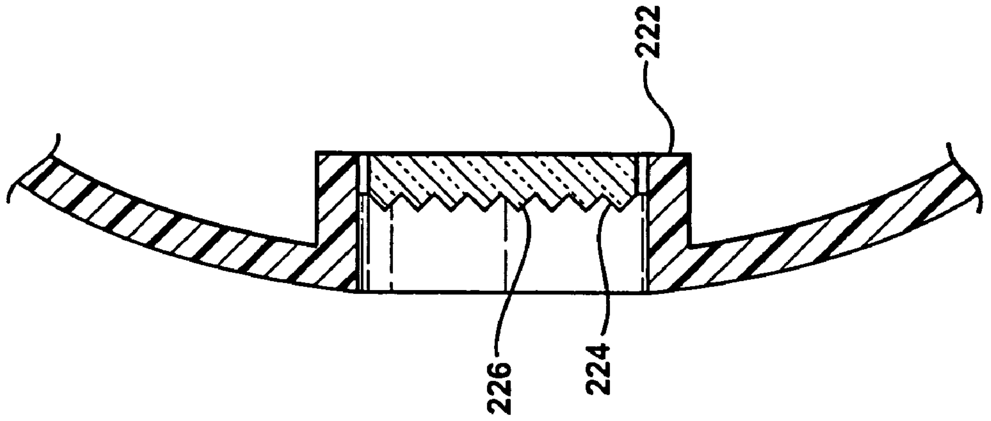
FIG. 4 is a cross sectional view of the internal lens according to a third embodiment.

Referring to FIG. 1, an optical or lens assembly for use on an automotive vehicle is generally indicated at 10. The lens assembly 10 includes a translucent lens holder 12 having a parabolically shaped wall 14. The wall 14 has opposite inner 16 and outer 18 surfaces. An opening 23 is formed in a generally central region of the wall 14.

The lens assembly 10 also includes an internal lens 20. The internal lens 20 is integrally formed with the lens holder 12 and is made of acrylic, polycarbonate or other conventional materials known by those skilled in the art. Optionally, the internal lens 20 is formed separate from and subsequently fixedly secured to the lens holder 12 by conventional methods, such as sonic welding or adhesives. The internal lens 20 is positioned along the inner surface 16 of the wall 14 adjacent the opening 20, so as to define a pocket or recess 21 along the outer surface 18.

Figure 3:
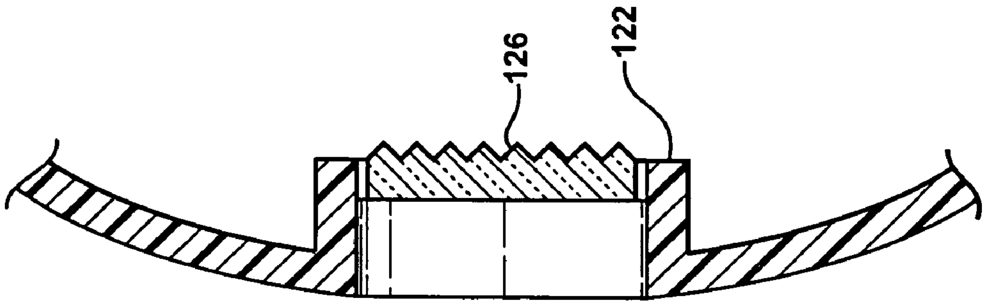
FIG. 3 is a cross sectional view of the internal lens according to a second embodiment.
Figure 2:
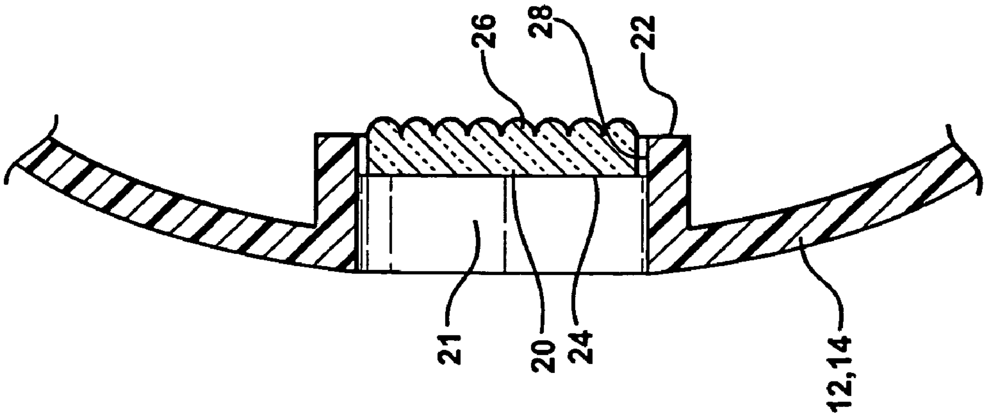
FIG. 2 is a cross sectional view of the internal lens.

The internal lens 20 is generally disc shaped with opposite first 22 and second 24 surfaces facing in generally the same direction as the inner 16 and outer 18 surfaces of the wall 14, respectively. The first surface 22 is defined by a plurality of outwardly extending light reflecting protrusions 26. Preferably, the protrusions 26 are pillow or generally hemisperically shaped, as shown in FIG. 2. Optionally, in a second embodiment, the protrusions 126 have a rectilinear or cubic corner shape, as shown in FIG. 3. Optionally, in a third embodiment, the protrusions 226 are defined in the second surface 224 rather than the first surface 222.

A reflex lens 30 is seated in the recess 21 in the wall 14. The reflex lens 30 is generally parallel with the internal lens 20. A space is defined between the reflex lens 30 and the internal lens 20. A hole 28 is formed in the internal lens 20 to ventilate the space between the reflect lens 30 and the internal lens 20.

The lens assembly 10 also includes a back wall 40 spaced apart from the lens holder 12. The back wall 40 includes a conventional socket 42 for supporting a light source 44. The back wall 40 also includes a reflective surface 46 facing the lens holder 12. An outer lens 50 is fixedly secured to the back wall 40.

In use, light and heat are emitted from the light source 44. Light from the light source 44 and also light reflected from the reflective surface 46 of the back wall 40 pass through the lens holder 12 and the outer lens 50. Both light and heat from the light surface are diffused or scattered by the protrusions 26 so that the reflex lens 30 and the outer lens 50 remain below their respective heat deflection temperatures. Some of the light reflected by the protrusions 26 is directed toward the reflective surface 46, and re-directed outwardly through the outer lens 50. Thus, the internal lens 20 serves the dual purposes of minimizing the temperatures of the reflex lens 30 and outer lenses 50, and increasing the overall brightness of the light observed coming from the lens assembly 10.

Figure 5:
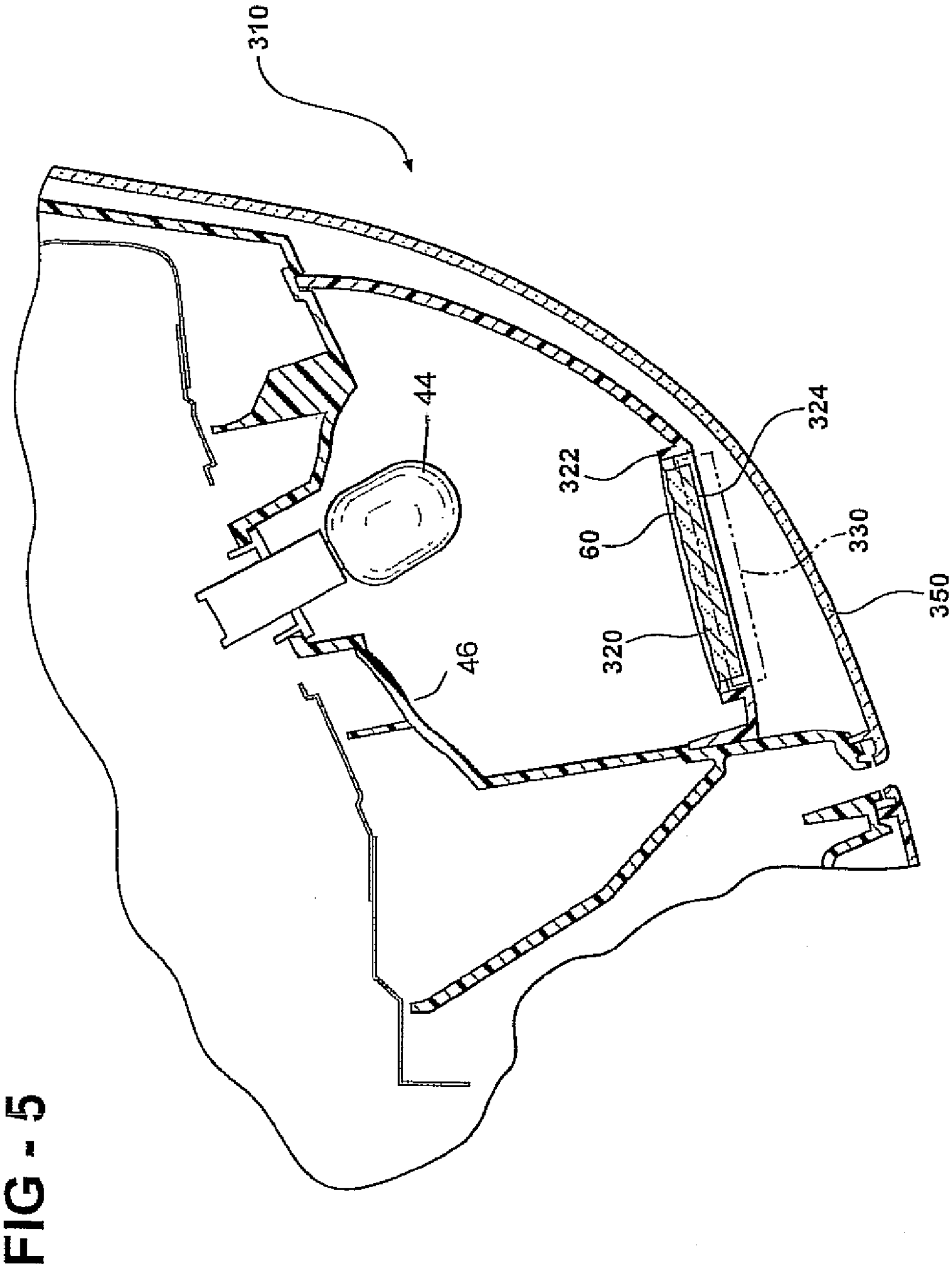
FIG. 5 is a cross sectional view of the light assembly according to a fourth embodiment of the invention.

Referring to FIG. 5, a fourth embodiment is shown, wherein a metallic layer 60 is provided along the first surface 322 of the internal lens 320. Preferably, the metallic layer 60 is aluminum. Optionally, the metallic layer 60 is provided on the second surface 324 of the internal lens 320. In use, the metallic layer 60 enhances the light and heat deflecting function of the internal lens 320. The metallic layer 60 provides still further enhancement of the overall brightness of the light observed coming from the lens assembly 310.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A motor vehicle lens assembly, said motor vehicle lens assembly comprising:

a light source;

a housing adapted to support said light source;

an outer lens spaced apart from said light source; and a lens holder disposed between said light source and said outer lens, said lens holder supporting a reflex lens and an internal lens between said light source and said outer lens, said lens holder holding said internal lens between said light source and said reflex lens, said internal lens having a first surface facing said light source and a second surface spaced apart from said reflex lens, said first surface having an integrally formed plurality of light reflecting protrusions extending outwardly in the direction of said light source for deflecting light and heat away from the reflex lens, said internal lens having a metallic layer disposed along said first surface facing said light source, said metallic layer allowing a portion of the light incident upon said metallic layer to pass through said metallic layer and said internal lens toward said reflex lens.

2. The motor vehicle lens assembly as set forth in claim 1, wherein said protrusions on said first surface are arcuately shaped, said internal lens having a generally planar second surface opposite said first surface.

3. The motor vehicle lens assembly as set forth in claim 1, wherein said protrusions are cube shaped.

4. The motor vehicle lens assembly as set forth in claim 1, wherein said metallic layer is aluminum.

5. The lens assembly as set forth in claim 1 including an aperture extending through said internal lens for ventilating a space defined between said reflex lens and said internal lens, said aperture being disposed along a periphery of said internal lens so as to not be visible externally through said outer lens.

* * * * *

UNITED STATES PATENT AND TRADEMARK OFFICE

CERTIFICATE OF CORRECTION

PATENT NO. : 7,399,106 B2
APPLICATION NO. : 11/151607
DATED : July 15, 2008
INVENTOR(S) : Paul Anthony Reading It is certified that error appears in the above-identified patent and that said Letters Patent is hereby corrected as shown below:

Item [57] Title page Abstract, line 5 replace “scatter” with --scatters--
Item [57] Title page Abstract, line 5 replace “diffuse” with --diffuses--
Column 1, line 25 replace “remain” with --remains--

Signed and Sealed this

Twenty-third Day of September, 2008

JON W. DUDAS
*Director of the United States Patent and Trademark Office*